United States Patent [19]

Tachino

[11] Patent Number: 4,624,005
[45] Date of Patent: Nov. 18, 1986

[54] VELOCITY DETECTION APPARATUS FOR AN ELEVATOR

[75] Inventor: Kenzo Tachino, Komaki, Japan

[73] Assignee: Mitsubishi Denki Kabushiki Kaisha, Japan

[21] Appl. No.: 664,415

[22] Filed: Oct. 24, 1984

[30] Foreign Application Priority Data

Oct. 28, 1983 [JP] Japan .................. 58-202100

[51] Int. Cl.[4] .............................................. G01D 7/00
[52] U.S. Cl. ..................................... 377/20; 187/29 R
[58] Field of Search ............................ 377/20, 24, 26; 187/29 R

[56] References Cited

U.S. PATENT DOCUMENTS

| | | | |
|---|---|---|---|
| 3,767,902 | 10/1973 | Estes, III ................ | 377/44 |
| 3,989,932 | 11/1976 | Koerner .................. | 377/20 |
| 4,052,676 | 10/1977 | Crittenden ............... | 377/20 |
| 4,093,850 | 6/1978 | Karnowski et al. ..... | 377/20 |
| 4,142,238 | 2/1979 | Brandt et al. .......... | 377/20 |
| 4,257,005 | 3/1981 | Hall ....................... | 377/20 |
| 4,446,946 | 5/1984 | Kajiyama et al. ....... | 187/29 R |

FOREIGN PATENT DOCUMENTS 57-72582  5/1982  Japan .

*Primary Examiner*—John S. Heyman
*Assistant Examiner*—Karl Ohralik
*Attorney, Agent, or Firm*—Leydig, Voit & Mayer, Ltd.

[57] ABSTRACT

A velocity detection apparatus for elevators wherein the time interval between movement magnitude pulses produced at a frequency-representing velocity of the cage of an elevator is detected, and the fixed frequency of sampling pulses is modulated using a modulation coefficient determined by the ratio of the fixed frequency of the sampling pulses to the frequency of the movement magnitude pulses so as to obtain a modulated pulse signal during the interval between the movement magnitude pulses from which the velocity of the elevator cage is obtained. Provision is made to include two memory units for storing the latest two count values on the basis of a sampling pulse signal to determine the difference therebetween corresponding to the velocity of the elevator cage. In an alternate embodiment, a pair of counters is provided for counting both the modulated pulses and the movement magnitude pulses of the elevator to produce count values representing the velocity of the elevator.

14 Claims, 4 Drawing Figures

VELOCITY DETECTION APPARATUS FOR AN ELEVATOR

BACKGROUND OF THE INVENTION

This invention relates to a velocity detection apparatus for elevators.

In the velocity control of elevators, there has recently been developed a system wherein the velocity of the cage of the elevator or the rotating velocity of the hoist motor thereof is digitally detected and is employed as a velocity feedback signal.

This system detects the velocity by generating movement magnitude pulses, which correspond to the magnitude of movement and direction of movement of the cage or the rotational angle and rotational direction of the hoist motor, and counting them at predetermined intervals. An apparatus for generating the movement magnitude pulses is disclosed in, for example, Japanese Laid-Open Patent Application No. 57-72582 (U.S. Pat. No. 4,446,946). The movement magnitude pulses in this system are, in general, derived from a disc which is rotated in direct coupling with the driving sheave of a hoisting machine or the sheave of a speed governor or through the medium of a transmission mechanism such as a pulley. They can also be derived from a disc which is rotated by a block around which a steel tape or the like coupled to the cage is wound. The disc is provided with apertures which are formed at equal intervals in the circumferential part thereof, and pulses at a frequency proportional to the rotational speed of the disc are produced by detecting the apertures optically or electromagnetically.

In the velocity control of an elevator, when employing movement magnitude pulses for the determination of a deceleration position and the positional feedback control of a velocity command in a deceleration region, the distance detection unit of the pulses may be on the order of several mm. When employing them for velocity feedback control, however, the speed of velocity detection becomes a problem with the above system wherein the movement magnitude pulses arriving within the predetermined period of time are counted to detect the velocity. The counting time intervals need to be shortened, and the distance detection unit of the movement magnitude pulses must be lowered by one to two orders. Moreover, in a low velocity region, the number of movement magnitude pulses arriving within a unit time decreases, and the distance detection unit of the movement magnitude pulses needs to be further lowered.

A movement magnitude pulse generator for fulfilling such conditions requires high mechanical precision which often involves high construction costs and therefore is not practical. At present, accordingly, a method is adopted in which the distance detection precision per pulse is enhanced by the mechanical means of speed-up coupling using gears or a pulley. The whole apparatus, however, also becomes very expensive.

SUMMARY OF THE INVENTION

This invention has solved the problems of the prior art described above, and has for its object to provide a velocity detection apparatus for an elevator which performs frequency modulation of a sampling pulse frequency to produce modulated pulses in correspondence with the time interval between the movement magnitude pulses, whereby the distance detection precision per pulse of the movement magnitude pulses is enhanced so as to make it possible to detect the velocity of a cage or the rotational velocity of a hoist motor precisely enough for the movement magnitude pulses to be employed for velocity feedback control.

In order to accomplish this object, according to this invention, the time interval between the movement magnitude pulses of the cage of an elevator is detected, and a frequency of the sampling pulses is modulated using a modulation coefficient based on the ratio fs/fc of the sampling pulse frequency to the movement magnitude pulse frequency, so as to obtain a pulse signal corresponding to count values of the modulated pulses from which the velocity of the cage is obtained.

Consequently, it is possible to realize an inexpensive velocity detection apparatus for an elevator which can enhance the velocity detection precision by one order or more as compared with the prior-art method wherein a velocity signal is obtained by counting the pulses of the movement magnitude pulse signal within a predetermined time, and which requires neither a movement magnitude pulse generator of high mechanical precision nor a speed-up mechanism such as gears.

DESCRIPTION OF THE PREFERRED EMBODIMENTS

Now, one embodiment of this invention will be described with reference to FIGS. 1 and 2.

Figure 1:
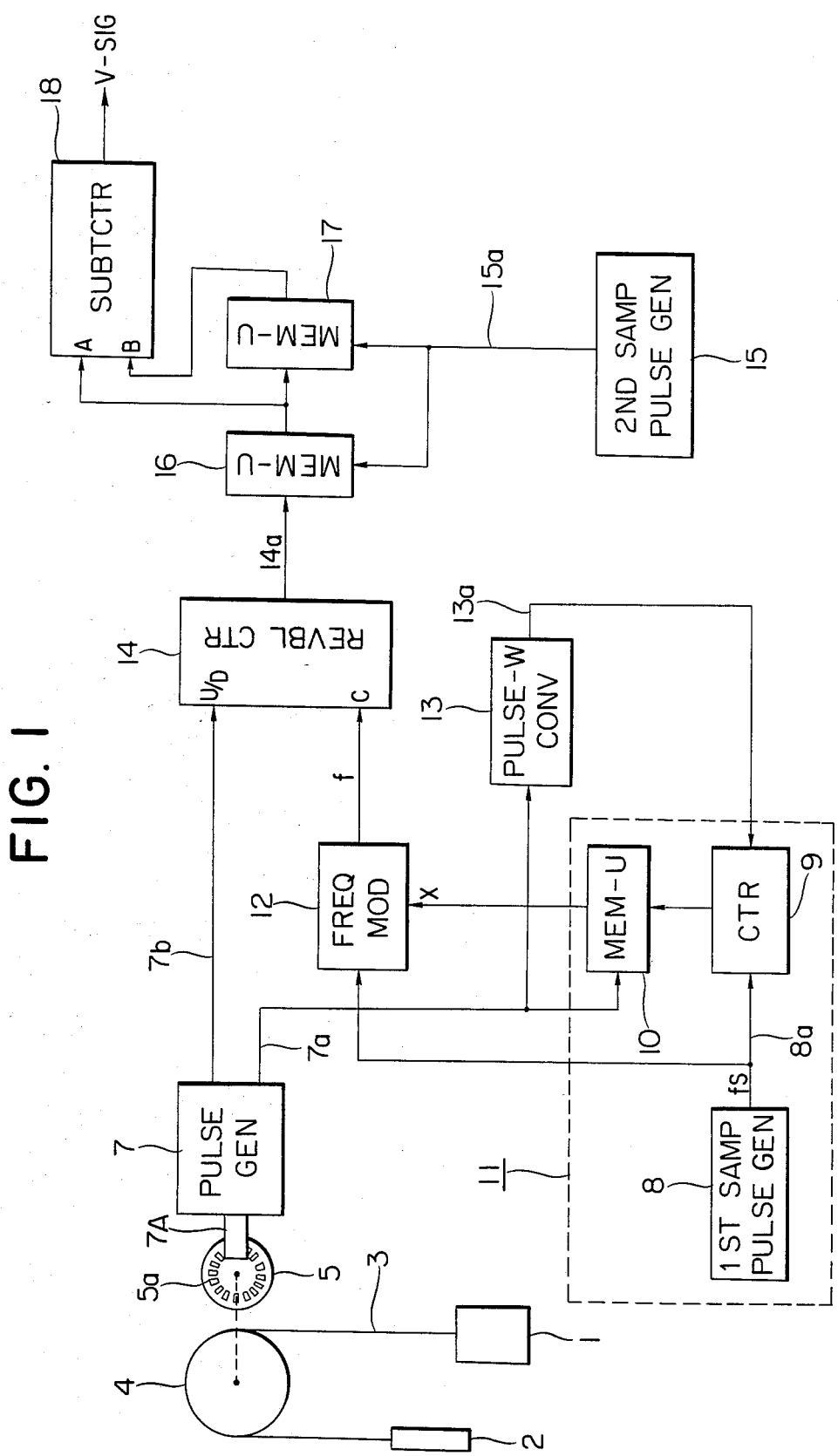
FIG. 1 is a block diagram showing one embodiment of a velocity detection apparatus for an elevator according to this invention.
Figure 2:
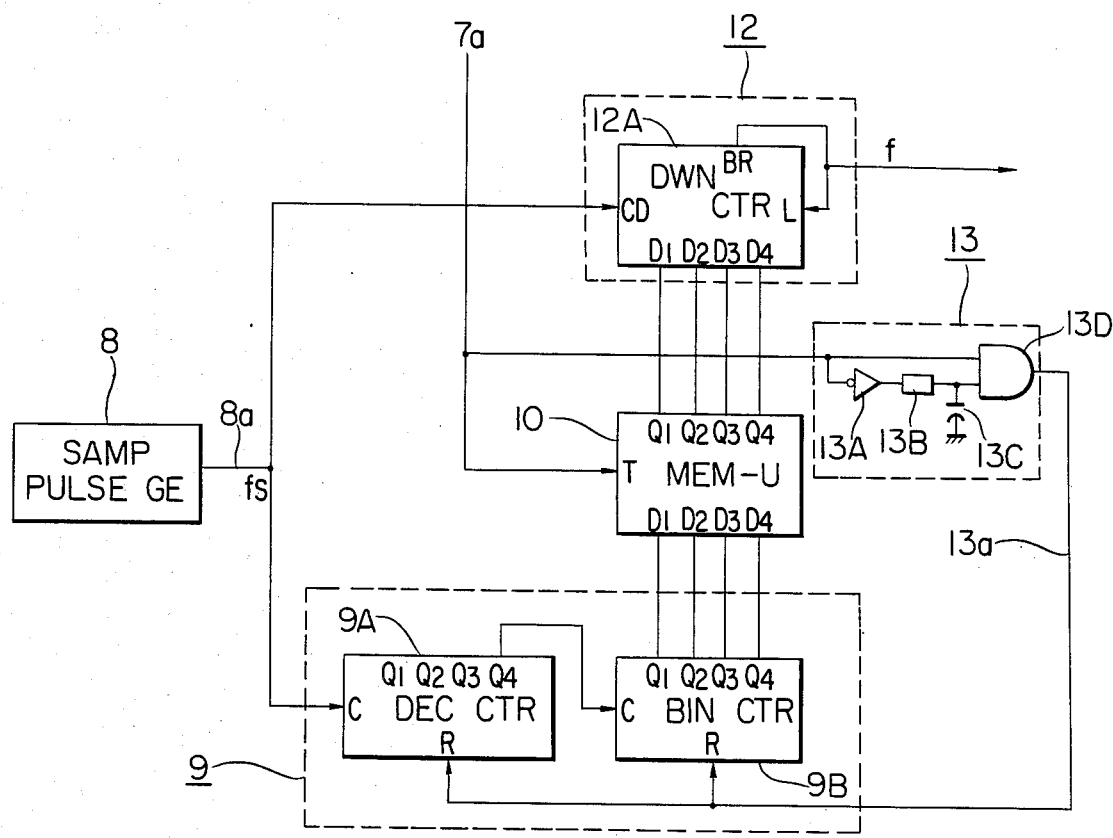
FIG. 2 is a block diagram showing the details of some of the circuits in FIG. 1.

In FIGS. 1 and 2, numeral 1 designates the cage of an elevator, numeral 2 a counterweight, numeral 3 a main rope which connects the cage 1 and the counterweight 2, numeral 4 the sheave of a hoisting machine which is disposed in a machine room and around which the main rope 3 is wound, and numeral 5 a disc which is directly coupled with the sheave 4 so as to rotate therewith and whose peripheral edge is provided with apertures 5a at equal intervals over the whole circumference. Numeral 7 designates a first pulse generation means, herein shown as movement magnitude pulse generator which has a pulse detector 7A for detecting the apertures 5a of the disc 5. This movement magnitude pulse generator 7 outputs first pulses in the form of a movement magnitude pulse signal 7a which is produced each time the cage 1 moves by a predetermined distance, for example, 1 mm, and a direction signal 7b which becomes "H" (a high level) for the ascent movement of the cage 1 and "L" (a low level) for the descent movement.

Second pulse generation means are also provided for producing modulated pulses at the frequency f which are supplied from the frequency modulator 12 to the clock input C of a reversible counter 14. Included in the second pulse generation means is a first sampling pulse generator 8 which produces sampling pulses 8a at a fixed frequency $f_s$ (a frequency sufficiently higher than that of the movement magnitude pulse signal 7a). Numeral 9 indicates a counter composed of a decimal counter 9A in FIG. 2 which counts the sampling pulses 8a, and a 4-bit binary counter 9B which is operated by the carry signal of the decimal counter 9A. Numeral 10 indicates a memory unit of 4 bits, the data inputs $D_1$-$D_4$ of which have the binary outputs $Q_1$-$Q_4$ of the counter 9B connected thereto, which stores the count of the counter 9B when the movement magnitude pulse 7a input to an input T has become "H". The memory unit 10, sampling pulse generator 8, and counter 9 constitute a pulse interval detector 11. A frequency modulator 12 is made of a down counter 12A with preset count inputs $D_1$-$D_4$ of 4 bits which are supplied with the stored data of the memory unit 10 as a preset value. It produces pulses at a frequency $$f = \frac{10}{X} f_s,$$

at which frequency the frequency $f_s$ of the sampling pulses 8a is modulated using the input value (preset value) X as a modulation coefficient input. Numeral 13 denotes a pulse width converter which is composed of a NOT gate 13A, a resistor 13B, a capacitor 13C, and an AND gate 13D. It is triggered by the rising edge of the movement magnitude pulse 7a and converts it into a pulse 13a whose pulse width is sufficiently narrower than the pulse width of the sampling pulse 8a. This pulse 13a is input to the decimal counter 9A and the binary counter 9B as a reset signal. The pulse interval detector 11, pulse width converter 13, and frequency modulator 12 comprise the second pulse generation means for generating modulated pulses having a frequency f which is supplied to the clock input C of the reversible counter 14 during the interval between the first pulses (the movement magnitude pulses) produced by the first pulse generation means 7.

The reversible counter 14 adds the pulses from the frequency modulator 12 applied to its clock input terminal C, when the direction signal 7b applied to its input terminal U/D is "H", and it subtracts them when the direction signal is "L". Numeral 15 denotes a second sampling pulse generator which produces pulses at a predetermined frequency. Numerals 16 and 17 denote memory units each having a trigger terminal t which receives the output pulse 15a of the second sampling pulse generator 15 as a trigger command. One memory unit 16 holds the count content of the reversible counter 14 upon a first output pulse 152, and the other memory unit 17 holds the stored content of the memory unit 16 upon a next output pulse of the generator 15. Numeral 18 denotes a subtracter having an input terminal A to which the output of the memory unit 16 is connected and an input terminal B to which the output of the memory unit 17 is connected. This subtracter 18 delivers the difference (A−B), which is the difference between the contents of the memory units 16 and 17, as a velocity signal.

Next, the operation of the present embodiment constructed as described above will be explained.

When the cage 1 moves, the rotation of the sheave 4 is transmitted to the disc 5. When the cage 1 ascends, the direction signal 7b of the movement magnitude pulse generator 7 becomes "H", and a movement magnitude pulse signal 7a is generated each time the cage 1 moves by 1 mm. On the other hand, when the cage 1 descends, the direction signal 7b becomes "L", and as in the ascent, a movement magnitude pulse signal is generated each time the cage 1 moves by 1 mm.

The decimal counter 9A counts the sampling pulses 8a, and upon counting ten pulses, it delivers one pulse from its output $Q_4$. Such delivered pulses are inputted to and counted by the binary counter 9B, which provides the binary output $Q_1$-$Q_4$ corresponding to the number of input pulses.

Figure 3:
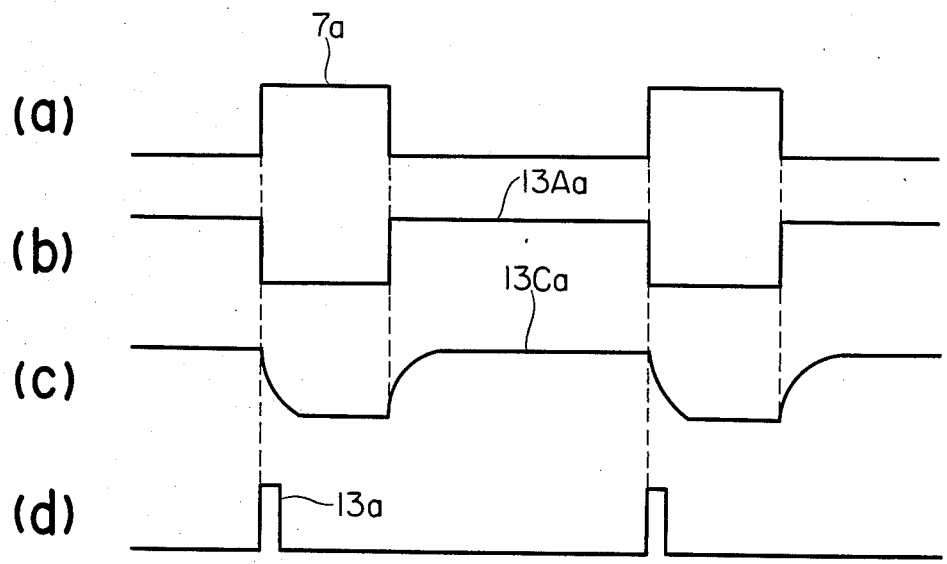
FIGS. 3(a) to 3(d) are waveform diagram of the outputs of various parts in the pulse width converter in FIG. 2.

Meanwhile, when the movement magnitude pulse signal 7a becomes "H" as illustrated in FIG. 3(a), the output 13Aa of the NOT gate 13A in the pulse width converter 13 is inverted to "L" as illustrated in FIG. 3(b). However, the charge of the capacitor 13C stored during the "H" of the output of the NOT gate 13A is slowly discharged due to the effect of the RC circuit as illustrated in FIG. 3(c), the output side of the AND gate 13D which receives the movement magnitude pulse signal 7a as one input thereof delivers the output pulse 13a illustrated in FIG. 3(d). Furthermore, when the movement magnitude pulse signal 7a becomes "L", the output 13Aa of the NOT gate 13A becomes "H". Since, however, the terminal potential of the capacitor 13C has not reached a high level yet, the pulse 13a is not generated. The width of the pulse 13a can be rendered sufficiently narrower than that of the sampling pulse 8a by properly selecting the values of the capacitor 13C and the resistor 13B.

In this way, each time the movement magnitude pulse signal 7a becomes "H", the pulse width converter 13 delivers one pulse 13a, thereby resetting the contents of the counters 9A and 9B to zero. Accordingly, the maximum value of the output $Q_1$-$Q_4$ of the counters 9A and 9B denotes the pulse time interval of the movement magnitude pulse signal 7a.

In the memory unit 10, the contents consisting of the 4 bits counted by the binary counter 9B are stored through the inputs $D_1$-$D_4$ when the movement magnitude pulse signal 7a becomes "H". In the down counter 12A, the stored contents of the memory unit 10 are preset through the inputs $D_1$-$D_4$ when the input L of this counter becomes "H". Further, the contents which are set are decreased each time the sampling pulse 8a is input to the input terminal CD of the down counter. When the sampling pulses 8a in a number corresponding to the value of the contents which were set have arrived, the down counter provides a pulse from its borrow output BR.

More specifically, 1/10 of the sampling pulses 8a are counted by the counter 9B between the pulses of the movement magnitude pulse signal 7a, the counted value is stored in the memory unit 10, and the stored value serves as the preset data of the down counter 12A. Therefore, ten pulses are delivered from the borrow output BR in the period of the next movement magnitude pulse 7a. This holds at all times provided that the pulse width of the movement magnitude pulse signal 7a remains constant and is not influenced by the magnitude of the pulse width. Accordingly, unless the pulse width of the movement magnitude pulse signal 7a changes abruptly, the output pulses of the frequency modulator 12 are generated substantially in the number of ten at fixed intervals between the arrival times of adjacent pulses of the movement magnitude pulse signal 7a. The generated pulses are additively or subtractively counted by the reversible counter 14. The count content of the reversible counter 14 indicates the distance of movement of the cage 1, and equivalently this distance of movement is ten times higher in precision than the distance of movement obtained by directly counting the movement magnitude pulses 7a.

Here, letting $f_c$ denote the frequency of the movement magnitude pulse signal 7a, the frequency f of the pulses to be input to the input terminal C of the reversible counter 14, namely, the output pulses of the frequency modulator 12 needs to be $$f = 10 f_c \quad (1)$$

Furthermore, letting Y denote the modulation factor of the frequency modulator 12, $$f = Y f_s \quad (2)$$

The output value X of the memory unit 10 is given as follows:

$$f_c = f_s/X \quad (3)$$

From Equations (1)–(3), the following equation is obtained:

$$Y = 10/X \quad (4)$$

Accordingly, the frequency modulator 12 responds to the modulation coefficient input X to modulate the sampling pulses 8a of the frequency $f_s$ into the frequency $$f = \frac{10}{X} f_s$$

and then deliver the modulated pulses.

Assuming now that the cage 1 is ascending, the direction signal 7b is "H" (high), and hence, the reversible counter 14 is in the additive counting status. This status continues from the generation of one movement magnitude pulse 7a till the generation of the next movement magnitude pulse 7a, to count the output pulses of the frequency modulator 12. Therefore, the contents of the reversible counter 14 increment by ten at equal time intervals as seen from Equation (1). Conversely, when the cage 1 descends, the direction signal 7b is "L" (low), and hence, the reversible counter 14 falls into the subtractive counting status. Then, the reversible counter 14 subtractively counts the output pulses of the frequency modulator 12 from the generation of one movement magnitude pulse 7a till the generation of the next movement magnitude pulse 7a, and the count contents decrease by 10 at equal time intervals.

The above count data 14a of the reversible counter 14 is stored in the memory unit 16 by the sampling pulse 15a of the second sampling pulse generator 15. The stored data is stored in the memory unit 17 by the next sampling pulse 15a, while at the same time the count data of the reversible counter 14 at this point of time is stored into the memory unit 16 anew. Accordingly, the count value of the reversible counter 14 during the pulse period of the sampling pulse signal 15a is delivered from the subtracter 18. That is, the magnitude of movement of the cage during the pulse period of the sampling pulse signal 15a is derived from the subtracter 18 as the velocity of the cage. Further, the subtracter 18 provides the value (A−B). Therefore, it provides a positive value for the velocity during ascent of the cage and a negative value for the velocity during descent.

Next, there will be explained the rate of change of the pulse period of the movement magnitude pulse signal 7a in the case where the moving velocity of the cage 1 has changed.

Now, letting the moving velocity of the cage 1 be v [m/s], the rate of velocity variation be a [m/s²], and the equivalent distance value of a unit pulse of the movement magnitude pulse signal 7a be ΔS [m], the period Δt [s] of the movement magnitude pulse signal 7a at the velocity v is $$\Delta t = \Delta S / v.$$

The period Δt' of the next movement magnitude pulse 7a can be approximated by $$\Delta t' = \frac{\Delta S}{v - \Delta t \cdot a} = \frac{\Delta S}{v - \frac{\Delta S \cdot a}{v}} = \frac{\Delta S \cdot v}{v^2 - \Delta S \cdot a},$$

so that the variation α of the period becomes $$\alpha = 1 - \frac{\Delta t}{\Delta t'} = 1 - \frac{\Delta S}{v} \cdot \frac{v^2 - \Delta S \cdot a}{\Delta S \cdot v} = \frac{\Delta S \cdot a}{v^2}.$$

Thus, the variation of the period is directly proportional to the equivalent distance value ΔS of the unit pulse and the rate of velocity variation a, and is inversely proportional to the square of the velocity v.

The case where the aforementioned variation α becomes the greatest corresponds to a point at which the velocity is low and the acceleration is a maximum. Assuming v = 0.5 [m/s], a = 1.0 [m/s²] and ΔS = 1 [mm], the variation becomes $$\alpha = \frac{0.001 \times 1.0}{0.5^2} = 0.004$$

Thus, the error in the velocity detection is small.

Figure 4:
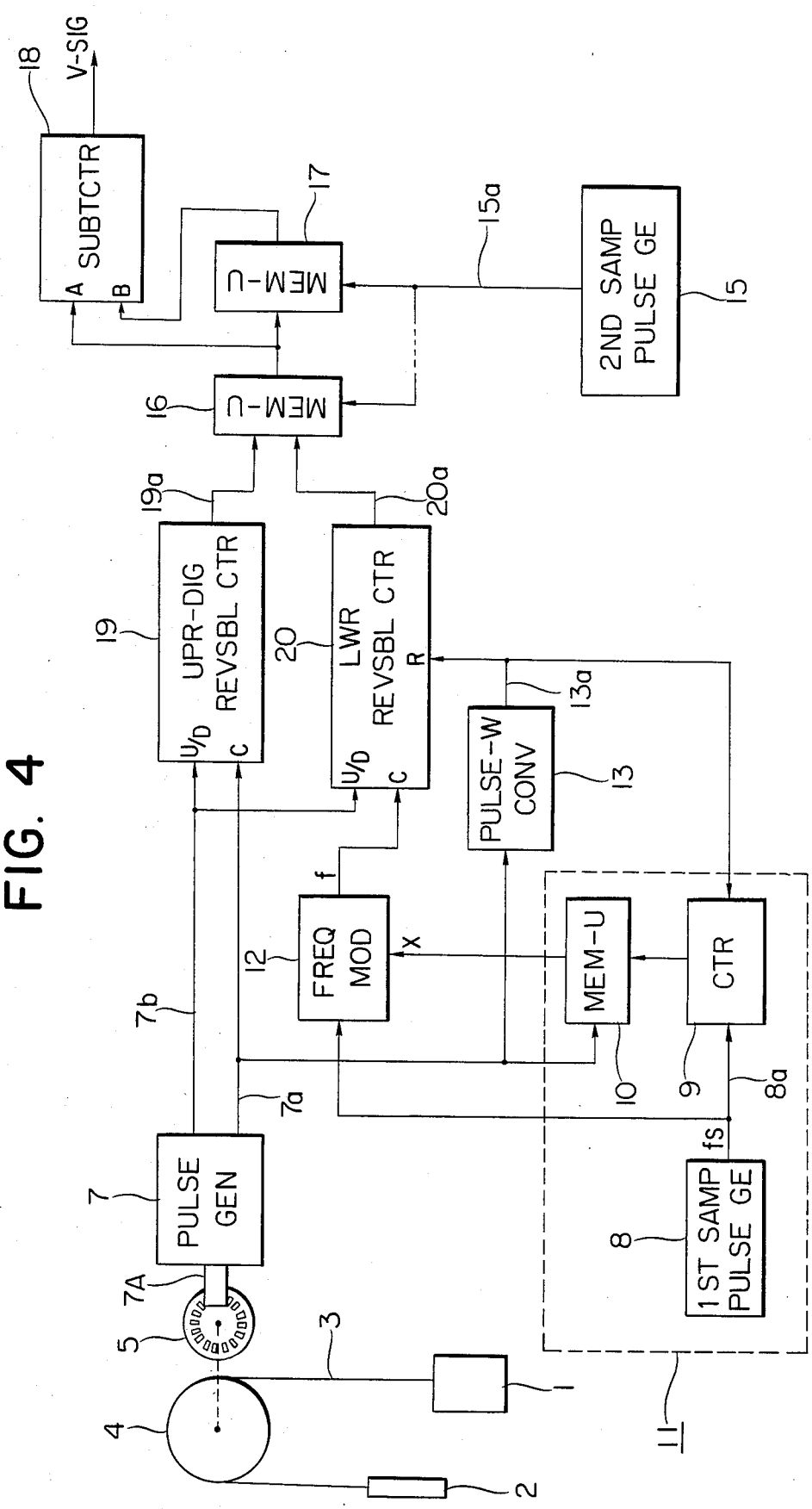
FIG. 4 is a block diagram showing another embodiment of this invention.

FIG. 4 shows another embodiment of this invention, in which the same symbols as in FIG. 1 indicate identical portions. As in the prior embodiment, this second embodiment includes a first pulse generator means for producing movement magnitude pulses 7a and 7b which are supplied on lines to an upper-digit reversible counter 19 and to a second pulse generation means including the pulse interval detector 11, the pulse width converter 13, and the frequency modulator 12 which supplies modulated pulses at the frequency f to a reversible counter 20.

The reversible counter 19 receives the movement magnitude pulse signal 7a as a count input and the direction signal 7b as an addition or subtraction setting input. It adds the pulses of the pulse signal 7a input to the clock input terminal C when the direction signal 7b to the input terminal U/D is "H" (high), and it subtracts the pulses when the direction signal is "L" (low), thereby generating the upper digit signal 19a of a cage position signal. The reversible counter 20 similarly generates a lower digit signal 20a, and is supplied at its clock terminal C with the modulated pulses from the frequency modulator 12 and at its reset terminal R with the pulse from the pulse width converter 13. The reversible counter 20 has its output reset to zero when the reset terminal R becomes "H" with the input terminal U/D thereof being "H", and it has its output reset to 9 when the reset terminal R becomes "H" with the input terminal U/D being "L".

The upper digit signal 19a and the lower digit signal 20a are applied to the memory unit 16, and they are stored at a trigger timing based on the sampling pulse 15a of the second sampling pulse generator 15.

Next, the operation of the above embodiment will be described.

When the cage 1 moves, the rotation of the sheave 4 is transmitted to the disc 5. When the cage 1 ascends, the direction signal 7b becomes "H", and a movement magnitude pulse signal 7a is generated each time the cage 1 moves by 1 mm. The reversible counter 19 additively counts the pulses of the movement magnitude pulse signal 7a, so that the upper digit signal 19a of the cage position increases. On the other hand, when the cage 1 descends, the direction signal 7b becomes "L", and hence, the reversible counter 19 subtractively counts the pulses of the movement magnitude pulse signal 7a to decrease the upper digit signal 19a of the cage position. Owing to these operations, the relative cage position signal in 1 mm units is provided from the reversible counter 19.

The decimal counter 9A (FIG. 3) counts the sampling pulses 8a, and upon counting ten pulses, it delivers one pulse from its output $Q_4$. Such delivered pulses are input to and counted by the binary counter 9B, which provides the binary output $Q_1$-$Q_4$ corresponding to the number of input pulses.

Meanwhile, when the movement magnitude pulse signal 7a becomes "H" as illustrated in FIG. 3(a), the output 13Aa of the NOT gate 13A in the pulse width converter 13 is inverted into "L" as illustrated in FIG. 3(b). Since, however, the charge on the capacitor 13C which was stored during the "H" of the output of the NOT gate 13A is gradually discharged as illustrated in FIG. 3(c), the potential across both the terminals of the capacitor becomes "H". Accordingly, the output side of the AND gate 13D which receives the movement magnitude pulse signal 7a as one input thereof delivers the output pulse 13a as illustrated in FIG. 3(d). When the movement magnitude pulse signal 7a becomes "L", the output 13Aa of the NOT gate 13A becomes "H". Since, however, the terminal potential of the capacitor 13C has not reached a high level yet, the pulse 13a is not generated. The width of the pulse 13a can be rendered sufficiently narrower than that of the sampling pulse 8a by properly selecting the values of the capacitor 13C and the resistor 13B.

In this way, each time the movement magnitude pulse signal 7a becomes "H", the pulse width converter 13 delivers one pulse 13a, thereby resetting the contents of the counters 9A and 9B to zero. Accordingly, the maximum value of the output $Q_1$-$Q_4$ of the counters 9A and 9B denotes the pulse time interval of the movement magnitude pulse signal 7a.

In the memory unit 10, the contents comprising 4 bits counted by the binary counter 9B are stored through the inputs $D_1$-$D_4$ when the movement magnitude pulse signal 7a becomes "H". In the down counter 12A, the stored contents of the memory unit 10 are preset through the inputs $D_1$-$D_4$ when the input L of this counter becomes "H". Further, the contents which are set are decreased each time the sampling pulse 8a is input to the input terminal CD of the down counter. When the sampling pulses 8a in a number corresponding to the set content value have arrived, the down counter provides a pulse from its borrow output BR.

More specifically, 1/10 of the sampling pulses 8a are counted by the counter 9B between the pulses of the movement magnitude pulse signal 7a, the counted value is stored in the memory unit 10, and the stored value serves as the preset data of the down counter 12A. Therefore, ten pulses are delivered from the borrow output BR in the period of the next movement magnitude pulse 7a. This holds at all times provided that the pulse width of the movement magnitude pulse signal 7a remains constant, and is not influenced by the magnitude of the pulse width. Accordingly, unless the pulse width of the movement magnitude pulse signal 7a changes abruptly, the output pulses of the frequency modulator 12 are generated substantially in the number of ten at fixed intervals between the arrival times of the adjacent pulses of the movement magnitude pulse signal 7a. The generated pulses are additively or subtractively counted by the reversible counter 20. Assuming that 1/10 of the minimum count value of the reversible counter 19 is the minimum count value of the reversible counter 20 and that the count capacity is 10, the output of the reversible counter 20 becomes the cage position lower-digit signal 20a, and a cage position signal having the units of 0.1 mm is obtained. That is, the cage position signal becomes high in precision owing to the cage position upper-digit signal 19a and lower-digit signal 20a.

Assuming now that the cage 1 is ascending, the direction signal 7b is "H", and hence the reversible counter 20 is in the additive counting status. When the movement magnitude pulse signal 7a is generated, the reversible counter 19 increases the count content by one, while at the same time the count content of the reversible counter 20 is reset to zero by the output pulse 13a of the pulse width converter 13. Then, the reversible counter 20 counts the output pulses of the frequency modulator 12 till the generation of the next pulse of the movement magnitude pulse signal 7a, so that the count content of the reversible counter 20 changes from zero to nine at equal intervals as seen from Equation (1).

Conversely when the cage 1 descends, the direction signal 7b is "L", and hence the reversible counter 20 falls into the subtractive counting status. When the movement magnitude pulse signal 7a has been generated, the reversible counter 19 decreases its content by one, while at the same time the output of the reversible counter 20 is reset to nine by the output pulse 13a of the pulse width converter 13. Until the next pulse of the movement magnitude pulse signal 7a is generated, the reversible counter 20 subtractively counts the output pulses of the frequency modulator 12, whereby the output of the reversible counter 20 changes from nine to zero at equal time intervals.

The count output signals 19a and 20a of the respective reversible counters 19 and 20 are stored in the memory unit 16 by the sampling pulse 15a. Further, the stored data of the memory unit 16 is stored in the memory unit 17 by the next sampling pulse 15a. At that time, the new count output signals 19a and 20a of the respective reversible counters 19 and 20 are stored in the memory unit 16 again. The movement magnitude of the cage during the pulse period of the sampling pulse 15a, namely, the velocity of the cage is derived from the subtracter 18 as in the preceding embodiment.

In this embodiment, the reversible counter 20 is reset to zero or nine each time the pulse of the movement magnitude pulse signal 7a arrives. Therefore, the error components of the output pulses of the frequency modulator 12 are not added, and the precision of the velocity signal to be derived from the subtracter 18 is more enhanced.

In order to detect the pulse width variation of the movement magnitude pulse signal 7a at still higher precision, the counting capacity of the binary counter 9B may be increased. In this case, the counting capacities of the memory unit 10 and the down counter 12A are similarly increased.

What is claimed is:

1. A velocity detection apparatus for an elevator comprising first pulse generation means for generating first pulses corresponding to the magnitude of movement of a cage in response to the rotational movement of a sheave of a hoisting machine and having a first pulse frequency and a given first width; second pulse generation means including a frequency modulator for generating modulated pulses having a frequency determined by a sampling pulse frequency fs higher than the first pulse frequency fc and a modulation factor x=fs/fc and having a pulse width inversely proportional to the width of the first pulses; and detection means for counting the modulated pulses for intervals determined by the first pulse frequency to produce count values and for detecting the count values of the modulated pulses representing velocity of said elevator.

2. A velocity detection apparatus for an elevator according to claim 1 wherein said second pulse generation means comprises a pulse interval detector for detecting the pulse time interval between adjacent first pulse.

3. A velocity detection apparatus for an elevator according to claim 2 wherein said pulse interval detector comprises a first sampling pulse generator for generating sampling pulses at a fixed frequency fs, a counter for counting first sampling pulses generated by said first sampling pulse generator between adjacent first pulses and producing said count values, and a memory unit for storing said count values of said counter.

4. A velocity detection apparatus for an elevator according to claim 3 wherein said counter provides an output each time the count value of the sampling pulses reaches a predetermined numerical value, and the outputs of said counter are stored in said memory unit.

5. A velocity detection apparatus for an elevator according to claim 4 where said memory unit supplies said frequency modulator with a signal corresponding to said outputs thereof, and the frequency modulator delivers said modulated pulses at a frequency f inversely proportional to the outputs of said counter.

6. A velocity detection apparatus for an elevator according to claim 5 wherein said frequency modulator receives and modulates the sampling pulses delivered from said first sampling pulse generator on the basis of the outputs from said memory unit.

7. A velocity detection apparatus for an elevator according to claim 3 whereing said memory unit is supplied with the first pulses, and stores a new count value delivered from said counter each time a first pulse is applied.

8. A velocity detection apparatus for an elevator according to claim 2 wherein said second pulse generation means further comprises a pulse width converter for generating a pulse signal of pulse width smaller than the pulse width of said first pulses each time the first pulse is generated, and said pulse interval detector is operated responsive to the pulse signal of said pulse width converter.

9. A velocity detection apparatus for an elevator according to claim 8 wherein said pulse interval detector comprises a counter for detecting the interval between adjacent first pulses, said counter delivers a count value responsive to said pulse signal of said pulse width converter.

10. A velocity detection apparatus for an elevator according to claim 1 wherein said detection means comprises a reversible counter receiving a signal representing a running direction of the cage generated by said first pulse generation means and the modulated pulses generated by said second pulse generation means and which adds or subtracts the number of modulated pulses in accordance with the running direction of the cage.

11. A velocity detection apparatus for an elevator according to claim 10 wherein said detection means further comprises a second sampling pulse generator for generating second sampling pulses at a predetermined frequency, and means for receiving an output of said reversible counter and an output of said second sampling pulse generator and for calculating the magnitude of movement of the cage on the basis of a change of the output of said reversible counter in a generation interval of the second sampling pulses, the calculated movement magnitude being delivered as the velocity signal.

12. A velocity detection apparatus for an elevator according to claim 11 wherein said receiving means comprises two memory units for storing the latest two count values provided by said reversible counter on the basis of the second sampling pulse signals, and a subtracter for receiving outputs of said two memory units and calculating the difference therebetween.

13. A velocity detection apparatus for an elevator comprising first pulse generation means for generating first pulses corresponding to the magnitude of movement of a cage in response to the rotational movement of a sheave of a hoisting machine and having a first pulse frequency and a given first width; second pulse generation means including a frequency modulator for generating modulated pulses having a pulse frequency higher than said first pulse frequency and said modulated pulses having a pulse width proportional to the width of the first pulses such that the period between arrival times of adjacent first pulses is divided into equal intervals by a preset number of modulated pulses when the velocity of the elevator is constant; and detection means for counting the modulated pulses for intervals determined by the first pulse frequency to produce count values thereof and for detecting the count values of the modulated pulses to represent velocity of said elevator.

14. A velocity detection apparatus for an elevator according to claim 13 wherein said detection means comprises a first counter for counting the first pulses, a second counter for counting said second pulses of the modulated pulse generation means and which resets its count value each time a first pulse arrives, and signal variation detection means for detecting the difference of the count values of said first and second counters at predetermined intervals by employing the output of said first counter as an upper digit signal and the output of said second counter as a lower digit signal.

* * * * *